F. C. CHRISTENSEN & T. W. FULLER.
HEADLIGHT DIMMER.
APPLICATION FILED JAN. 2, 1914.
1,143,611.
Patented June 22, 1915.
2 SHEETS—SHEET 1.
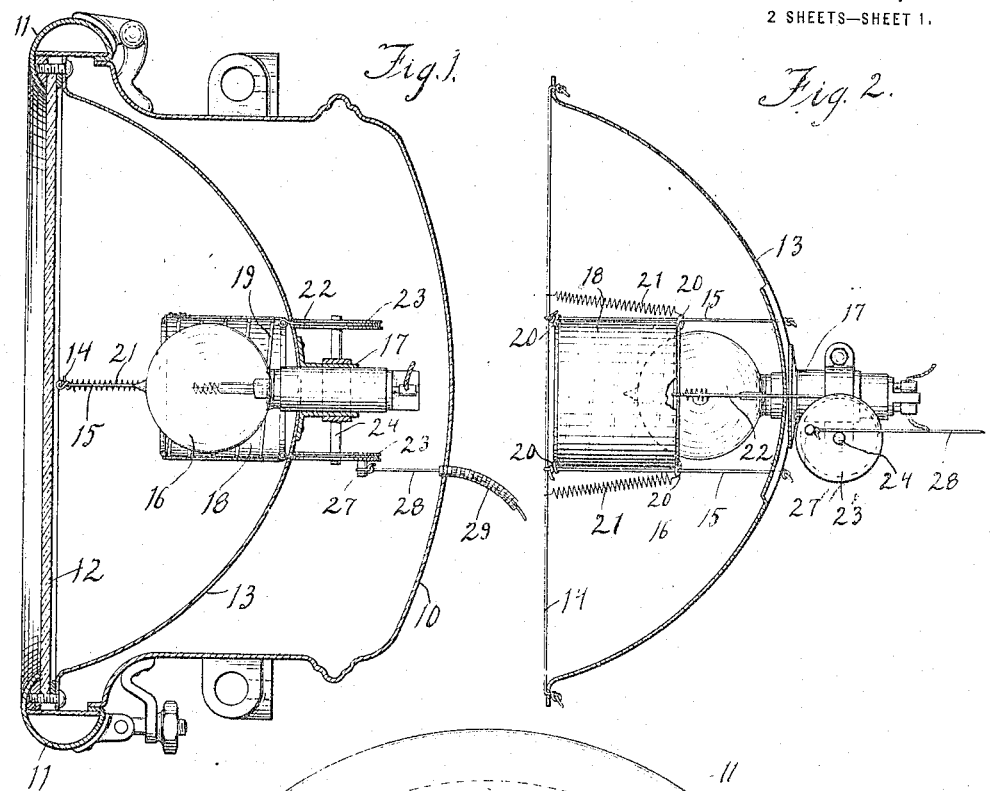
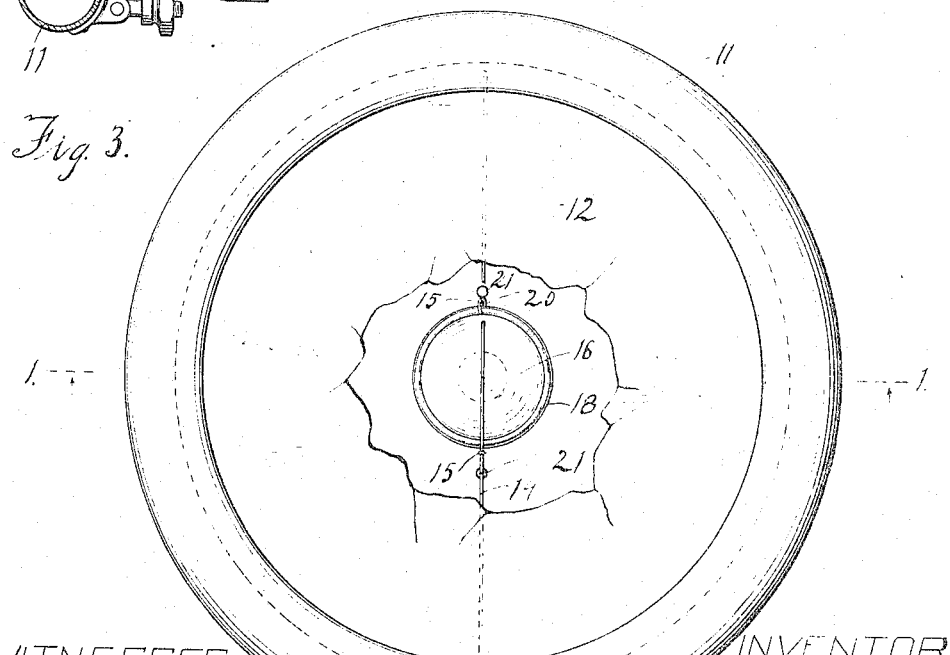
WITNESSES
C. F. Miller.
Katherine Holt
INVENTORS.
Frederick C. Christensen
& Theodore W. Fuller
By Morrell & Caldwell.
ATTORNEYS

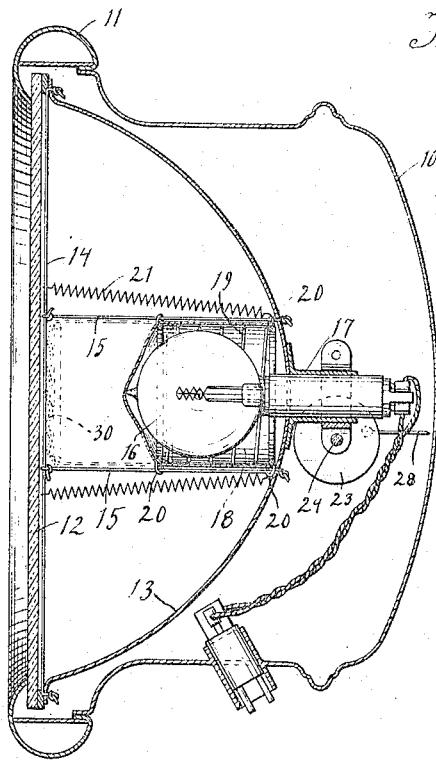
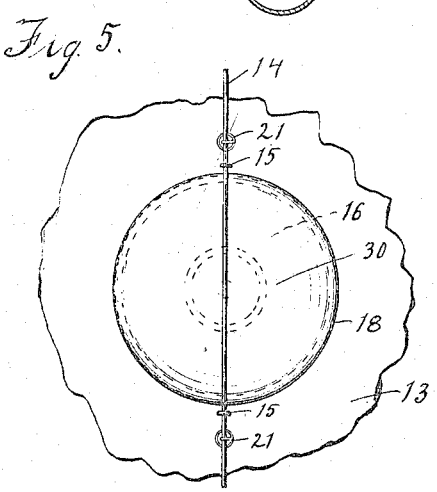
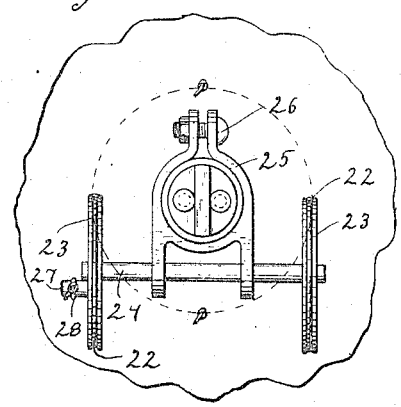

UNITED STATES PATENT OFFICE.

FREDERIK C. CHRISTENSEN AND THEODORE W. FULLER, OF RACINE, WISCONSIN.

HEADLIGHT-DIMMER.

1,143,611. Specification of Letters Patent. Patented June 22, 1915.

Application filed January 2, 1914. Serial No. 809,836.

*To all whom it may concern:*

Be it known that we, FREDERIK C. CHRISTENSEN and THEODORE W. FULLER, citizens of the United States, and residents of Racine, in the county of Racine and State of Wisconsin, have invented new and useful Improvements in Headlight-Dimmers, of which the following is a description, reference being had to the accompanying drawings, which are a part of this specification.

This invention relates to headlight dimmers and has for its object to provide for diminishing the intensity of an electric headlight of an automobile or the like, with control at the dash or convenient to the driver so that on approaching another vehicle or on entering a town or city the lights may be dimmed to avoid the intense direct rays of the light and substitute a subdued light sufficient for warning purposes.

With the above object in view the invention consists in a headlight dimmer in which a tubular guard or shield is movable in the line of direction of the main rays of light from the headlight from a position in front of the electric lamp bulb to a position surrounding the same so as to intercept the rays of light from the lamp bulb to the reflector.

With the above and other objects in view the invention consists in the headlight dimmer as herein claimed and all equivalents.

Referring to the accompanying drawings in which like characters of reference indicate the same parts in different views: Figure 1 is a horizontal sectional view of a headlight constructed in accordance with this invention; Fig. 2 is a vertical sectional view through the reflector and lamp portion thereof; Fig. 3 is a front view of such headlight with the glass broken away to show the interior; Fig. 4 is a vertical sectional view of a headlight showing a modified form of the dimmer of this invention; Fig. 5 is a detail front view of a portion thereof; and Fig. 6 is a detail rear view of the central portion of either form of the device.

In these drawings 10 indicates a lamp casing of ordinary construction having the swinging door 11 as usual carrying the glass front 12 and the reflector 13. A wire 14 is stretched vertically across the front of the headlight just behind the glass 12 with its end connected to the edges of the reflector 13. A pair of guide wires 15 are attached to this vertical wire 14 and extend rearwardly through the reflector 13, to which they are attached, one being above and the other being below the electric lamp bulb 16 which is mounted in a tubular socket 17 at the center of the reflector as usual. A cylindrical guard or shield 18 preferably consisting of a covering of opaque or translucent material, such as cloth, surrounding a coil spring frame 19 is slidably mounted on the guide wires 15, as by having loops 20 projecting therefrom and surrounding the guide wires, and a pair of coil springs 21 connect this guard or shield 18 with the vertical wire 14 so as to give it a tendency to remain in its outer position as shown in Fig. 2. A pair of wires 22 are also connected with the guard or shield 18 and pass rearwardly through the reflector 13 and are attached respectively to a pair of grooved pulleys 23 fixed on a shaft 24 which is journaled in a clamp 25 surrounding the lamp socket 17 and firmly held in position thereon by means of a clamping bolt 26. A wrist pin 27 on one of the grooved pulleys 23 has a wire 28 connected to it and passing through the back of the casing 10 and then through an armored conduit 29 to any convenient position on the dash or wherever it will be within easy reach of the driver.

In operation the guard or shield when in its normal outer position, as shown in Fig. 2, does not materially affect the brilliancy of the light, for the rays directly ahead pass through the guard and the guard is not in the path of the rays to the reflector, but when it is desired to dim the light it is only necessary to pull on the wire 28 and thus turn the shaft 24 and draw the guard or shield to its inner position, as shown in Fig. 1, where it intercepts the path of the rays to the reflector and leaves only the direct rays effective. The wire 28 may be fastened in any desirable manner in the position in which it holds the guard or shield in this position, but as soon as the wire is released the springs 21 return the guard or shield to its outer position to restore the headlight to its full effect.

In the modification shown in Figs. 4 and 5 the guard or shield is provided with a closed end 30 at its outer end which may be of the flexible material forming the covering, but when the covering of the guard or shield 18 is of opaque material this end 30 is preferably of a translucent material which will allow of a sufficient amount of light to pass therethrough for ordinary city driving.

By means of this invention the headlights of an automobile or a locomotive or an interurban train or for any similar purpose may be instantly changed from their full light effect to their subdued effect so as to comply with city ordinances prohibiting the use of strong headlights within city limits and this change may be produced without stopping the car.

What we claim as new and desire to secure by Letters Patent is:

1. In a headlight or the like having an electric lamp and its reflector, a spring retracted tubular guard normally held in a position in front of the electric light, and means for drawing the guard to a position surrounding the electric lamp where it will intercept the rays of light to the reflector.

2. In a headlight or the like having an electric lamp and its reflector, a tubular guard movable axially of the headlight from a position in front of the electric light to a position surrounding the electric light where it intercepts the rays of light to the reflector, and a translucent covering on the outer end of the guard.

3. In a headlight or the like having an electric lamp and its reflector, a wire stretched across the reflector, a pair of parallel guide wires connecting said wire with the reflector, a tubular guard slidably mounted on the guide wires, springs connecting the guard with the first mentioned wire for normally holding the guard in front of the electric lamp, and means for drawing the guard along the guide wires to a position where it surrounds the electric lamp and intercepts the rays of light to the reflector.

4. In a headlight or the like having an electric lamp and its reflector, a spring retracted cylindrical guard suitably mounted to move from a position in front of the electric lamp to a position where it surrounds the electric lamp and intercepts the rays of light to the reflector, and means for moving the guard to the latter position, comprising wires connected with the guard and passing through the reflector, a pair of grooved pulleys to which the wires are secured, a shaft carrying the grooved pulleys, a clamp surrounding the lamp socket and forming a support for the shaft, and means for turning the shaft.

5. In a headlight or the like having an electric lamp and its reflector, a wire stretched across the front of the lamp and connected to the edges of the reflector, a pair of parallel guide wires connected with the first mentioned wire and secured to the reflector, a tubular guard or shield comprising a coil spring with a covering having projecting loops engaging the guide wires, springs connecting the guard or shield with the first mentioned wire, and means for drawing the guard or shield along the guide wires to a position where it surrounds the electric lamp and intercepts the rays of light to the reflector.

6. In a headlight or the like having an electric lamp and its reflector, a wire stretched across the reflector and connected to the edges thereof, a pair of parallel guide wires connected with the first mentioned wire and to the reflector, a tubular guard or shield slidably mounted on the guide wires, springs connecting the guard or shield to the first mentioned wire to hold it normally in a position in front of the electric lamp, a clamp engaging the electric lamp socket, a shaft journaled in the clamp, a pair of grooved pulleys on the shaft, wires mounted on the grooved pulleys and passing through openings in the reflector and connected with the guard or shield, a wrist pin on one of the grooved pulleys, and a wire connected with the wrist pin for turning the shaft to pull the guard or shield to a position where it surrounds the electric lamp and intercepts the rays of light to the reflector.

In testimony whereof, we affix our signatures, in presence of two witnesses.

FREDERIK C. CHRISTENSEN.
THEODORE W. FULLER.

Witnesses:
Flora Peterson,
Nels Christensen.